No. 741,637. PATENTED OCT. 20, 1903.
H. H. DOW.
PROCESS OF EXTRACTING BROMIN FROM BRINE.
APPLICATION FILED MAY 21, 1903.
NO MODEL.
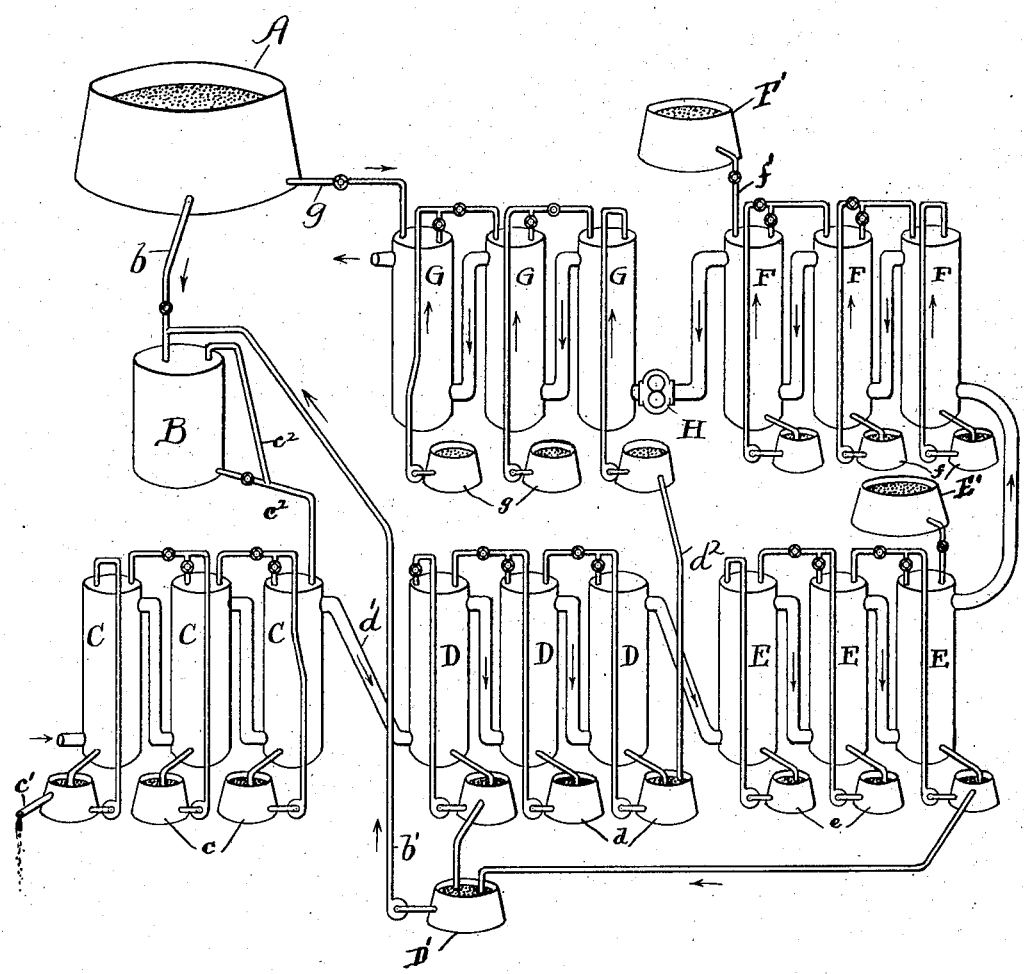
Witnesses.
E. B. Gilchrist
G. W. Saywell
Inventor:
Herbert H. Dow
by J. B. Fay
Atty.

No. 741,637. Patented October 20, 1903.

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF EXTRACTING BROMIN FROM BRINE.

SPECIFICATION forming part of Letters Patent No. 741,637, dated October 20, 1903.

Application filed May 21, 1903. Serial No. 158,078. (No specimens.)

*To all whom it may concern:*

Be it known that I, HERBERT H. DOW, a citizen of the United States, and a resident of Midland, county of Midland, and State of Michigan, have invented a new and useful Improvement in Processes of Extracting Bromin from Brine, of which the following is a specification, the principle of the invention being herein explained and the best mode in which I have contemplated applying that principle, so as to distinguish it from other inventions.

My invention consists in an improved process for more economically extracting bromin from natural bromid brines with the production of a bromid containing some chlorin, but of sufficient purity to be well adapted for the manufacture of liquid bromin where a high degree of purity is not required—as, for example, in the extraction of gold from ores. Said process consists of a series of steps hereinafter fully described.

The annexed drawing and the following description set forth in detail one mode of carrying out the invention, such disclosed mode constituting but one of various ways in which the principle of the invention may be used.

In said annexed drawing is represented a diagrammatic view of a form of apparatus used in my improved process.

In said form of apparatus, A represents a reservoir containing a natural bromid brine, from which the brine flows to the oxidizer B, in which the brine is oxidized sufficiently to set free practically all the contained bromin in any one of various ways explained in my reissued United States Letters Patent No. 11,232. I have found that more or less free chlorin will always be formed before all of the bromin is set free. It is therefore necessary to remove this chlorin before a good bromid can be made. It is also very desirable to conserve the oxidizing energy existing in this free chlorin, and it is to accomplish these ends that the process herein described was invented. The brine now oxidized as above explained passes from the oxidizer B through the duct $c^2$ into a series of blow-out towers C, no special form of tower being required, many forms of apparatus for bringing liquids into contact with gases being familiar to technical chemists. Lunge-plate columns or coke-towers are common examples of apparatus that may be employed for this purpose. A part of the brine from the reservoir A is permitted to flow through a tailings-tower G. The brine is allowed to run continuously and simultaneously through the ducts $b$ and $g$, respectively, into the oxidizer B and the tailings-tower G. That part of the brine which passes through the tailings-tower G is allowed to pass through a duct $d^2$ into a purifier D. Purifier D consists of a series of towers of a construction similar to that of the blow-out towers and in which any gas that may be passing therethrough may be brought into intimate contact with the brine flowing therein. From the purifier D the brine flows to the tank D' and is thence pumped through a pipe $b'$ into the oxidizer B, so that it is seen all the brine from the reservoir A eventually passes through the oxidizer B. The oxidation in the oxidizer B of the brine flowing through it results in the production of free bromin and a certain amount of chlorin, as already explained, which are carried into the blow-out towers C, from whence they are carried out through the duct $d'$ in a current of air that is drawn through the blow-out towers by the exhauster H. The brine, practically divested of all its bromin in the blow-out towers, flows from them into the waste through the duct $c'$. The bromin and chlorin laden air is drawn through the brine-purifiers D, thence through the bromid-purifiers E, and finally comes into contact with the alkali in the absorption-towers F, wherein most of the bromin is absorbed by an absorbent fed into these towers from the receptacle F' through the pipe $f'$. A small amount of bromin, however, for reasons to be hereinafter explained, will still remain in the air. This trace of bromin is recovered in the second absorption-tower G. Through the bromid-purifiers E there circulates a strong bromid solution, provided from a suitable source, such as the receptacle E'. Pumps and tanks $g$, $f$, $e$, $d$, and $c$, respectively, serve to convey the respective solutions passing through them to the successive towers of the respective series of towers G, F, E, D, and C.

If it is desired to make sodium bromid, sodium carbonate is preferably used in the alkali-towers F, for although other sodium compounds, such as caustic soda, would absorb the bromin much more readily, yet since the brine may contain more carbon dioxid than bromin this caustic soda would be soon converted into a carbonate of soda. I therefore prefer the use of the latter as an absorbing agent where sodium bromid is to be made, and I further consider this latter material to be the best adapted of all the bromids for the manufacture of liquid bromin. Inasmuch as carbonate of soda reacts very sluggishly with bromin, it becomes an economic impossibility to extract all the bromin from the air with this substance, and so the tailings-tower G is used to recover the balance of the bromin. This latter absorption is effected by the use of the natural brine which is flowing through these towers from the reservoir A and which, as explained in my United States Letters Patent No. 714,160, contains impurities—such as hydrogen sulfid, carbonate of iron, &c.—which are oxidized by and are capable of absorbing the bromin. All natural brines contain these impurities to a greater or less extent, which are not added for the purpose of absorbing oxidizing agents, but are necessary evils originally existing in the brines and which have to be oxidized before the bromin itself that is contained in the brines can be set free. At this point of the process, therefore, a double object is accomplished by the presence of these reducing agents—the traces of bromin not taken up in the towers F are saved in the brine in the towers G and the reducing agents in this portion of the brine are oxidized, whereby oxidizing energy, such as chlorin or its equivalent, is saved, when the brine is further oxidized in the tower B. That part of the brine which I shall designate as "stream No. 2," that flowing direct from the reservoir A into the oxidizer B being No. 1, which is thus partially oxidized by the bromin in the tailings-tower G, contains more bromin than the raw brine, and is therefore especially well adapted to take up chlorin in the brine-purifiers D and to give up bromin in exchange, such chlorin being furnished by the current of bromin and chlorin laden air being drawn through the blow-out towers C by the exhauster H, which current of air is thus divested of part of its chlorin and further enriched with bromin, according to the reaction

NaBr+Cl=NaCl+Br, which bromin after passing with the current of air through the bromid-purifiers E is to a greater or less extent absorbed in the absorption-towers F, as has been hereinbefore explained. After this exchange of bromin for chlorin has been effected in the towers D this second stream of brine, now containing considerable dissolved bromin, is pumped into the oxidizer B and passes with stream No. 1 through the oxidizer and blow-out towers C, whereby its bromin, both free and combined, is removed.

It will be noted that a given weight or volume of brine coming to B from D requires less energy to oxidize it completely than does an equal weight or volume of the brine as yet untreated flowing direct to B and that this difference in energies required is equal to the energy in the chlorin absorbed in D plus that in the bromin absorbed in G. The energy of oxidation represented by the free chlorin coming from C and the free bromin not absorbed in F and passing to G is conserved to the system by the process disclosed, so that I am able thereby to recover practically all of the bromin in the brine with a minimum expenditure of oxidizing energy.

The bromid-purifiers E are all of the same general type as the other towers and serve the purpose of removing the chlorin from the air passing therethrough in the manner that is fully explained in my United States Letters Patent No. 714,160. Where it is not desirable that the amount of the chlorids in the final products should be reduced to a minimum, these purifiers E may be omitted, and in that case the air would pass directly from the towers D to the towers F.

By the term "pure air" I shall be understood to mean ordinary atmospheric air that has not been submitted to a prior treatment and that is not again used, in contradistinction to the use of air as shown in my United States Letters Patent No. 714,160 in the process disclosed, in which the same air is used repeatedly on a closed circuit.

I claim—

1. The steps in the continuous process of manufacturing bromin from bromid-containing brines which consist, in dividing the untreated brine into two parts, in oxidizing portions of such parts separately and simultaneously, and then subsequently oxidizing another portion of one part by the products of the oxidation of the first portion of the other part.

2. The steps in the continuous process of manufacturing bromin from bromid-containing brines which consist, in dividing the untreated brine into two parts, in oxidizing portions of such parts separately and simultaneously with the production of a free halogen in each, and then subsequently oxidizing another portion of one part by the halogen produced by the oxidation of the first portion of the other part.

3. The steps in the continuous process of manufacturing bromin from bromid-containing brines which consist, in dividing the untreated brine into two parts, in oxidizing portions of such parts separately and simultaneously with the production of free bromin in each, and then subsequently oxidizing another portion of one part by the bromin produced by the oxidation of the first portion of the other part.

4. The steps in the continuous process of manufacturing bromin from bromid-containing brines which consist, in dividing the untreated brine into two parts, in oxidizing portions of such parts separately and simultaneously with the production of free bromin and free chlorin in the one, and the production of free bromin in the other, and then subsequently oxidizing another portion of one part by the products of the oxidation of the first portion of the other part.

5. The steps in the continuous process of manufacturing bromin from bromid-containing brines, which consist, in dividing the untreated brine into two parts, in oxidizing portions of said parts separately and simultaneously with the production of free bromin and free chlorin in the one and the production of free bromin in the other, and then subsequently oxidizing other portions of the second part with the bromin and chlorin obtained by the oxidation of the first portion of the first part.

6. The steps in the process of manufacturing bromin from bromid-containing brines which consist, in dividing said brine into two portions, in oxidizing each portion with the production of a free halogen in each, in bringing the products of such oxidations into intimate contact, whereby halogen of the one is exchanged for halogen of the other, and in then uniting one portion and its new halogen with the other portion as yet unoxidized.

7. The steps in the process of manufacturing bromin from bromid-containing brines which consist, in dividing said brine into two portions, in oxidizing each portion with the production of a free halogen in each, in bringing the products of such oxidations into intimate contact, whereby halogen of the one is exchanged for halogen of the other, absorbing the halogens of one portion, and uniting the other portion and its halogen with the first portion as yet unoxidized.

8. The steps in the process of manufacturing bromin from bromid-containing brines which consist, in absorbing bromin from bromin-laden air by means of untreated brine, and then absorbing, by means of the brine thus enriched with bromin, chlorin from chlorin-laden air which is circulating in the same air-circuit with the bromin-laden air.

9. The steps in the continuous process of manufacturing bromin from bromid-containing brines which consist, in bringing pure air successively into contact with one portion of oxidized brine containing a free halogen, and then into contact with another portion of brine oxidized by the halogen in the first portion.

10. The steps in the continuous process of manufacturing bromin from bromid-containing brines which consist, in bringing pure air successively into contact with one portion of oxidized brine containing free bromin, and then into contact with another portion of brine oxidized by the bromin of the first portion.

11. The steps in the continuous process of manufacturing bromin from bromid-containing brines which consist, in bringing pure air successively into contact with one portion of oxidized brine containing free bromin and free chlorin, and then into contact with another portion of brine oxidized by the bromin of the first portion.

12. The steps in the continuous process of manufacturing bromin from bromid-containing brines which consist, in bringing pure air successively into contact with one portion of oxidized brine containing free bromin, into contact with another portion of brine oxidized by the bromin of the first portion, and then into contact with a solution of a bromin absorbent.

13. The steps in the continuous process of manufacturing bromin from bromid-containing brines which consist, in bringing pure air successively into contact with one portion of oxidized brine containing free bromin, into contact with another portion of brine oxidized by the bromin of the first portion, and then into contact with a solution of an alkaline carbonate.

14. The steps in the continuous process of manufacturing bromin from bromid-containing brines which consist, in bringing pure air successively into contact with one portion of oxidized brine containing a free halogen, into contact with another portion of brine oxidized by the halogen of the first portion, and then into contact with a solution of sodium carbonate.

15. The steps in the continuous process of manufacturing bromin from bromid-containing brines which consist, in bringing pure air successively into contact with one portion of oxidized brine containing a free halogen, into contact with another portion of brine oxidized by the halogen of the first portion, into contact with a solution of sodium carbonate, and then into contact with natural brine containing a reducing agent.

16. The steps in the continuous process of manufacturing bromin from bromid-containing brines which consist, in bringing pure air successively into contact with one portion of oxidized brine containing free bromin, into contact with another portion of brine oxidized by the bromin in the first portion, into contact with a solution of sodium carbonate, and then into contact with a natural brine containing bromid and a reducing agent.

17. The steps in the continuous process of manufacturing bromin from bromid-containing brines which consist, in bringing pure air successively into contact with one portion of oxidized brine containing free bromin, into contact with another portion of brine oxidized by the bromin of the first portion, into contact with a solution of sodium carbonate, and then into contact with a natural brine containing bromid and a reducing agent, said last-named natural brine subsequently becoming the "other portion of brine oxidized by the bromin of the first portion," as mentioned above in the second step.

18. The steps in the process of manufacturing bromin from bromid-containing brines which consist, in dividing said brine into two portions, oxidizing one portion sufficiently to set free practically all the contained bromin, blowing out the bromin and chlorin thus produced, and using the other portion as a purifying agent for absorbing chlorin from the bromin and chlorin laden air.

19. The steps in the process of manufacturing bromin from bromid-containing brines which consist, in dividing said brine into two portions, oxidizing one portion sufficiently to set free practically all the contained bromin, extracting the bromin thus set free by means of air, passing the bromin-laden air through an absorbent, and then using the second portion of brine to absorb the bromin not taken up by the prior absorbent.

20. The steps in the process of manufacturing bromin from bromid-containing brines which consist, in dividing said brine into two portions, oxidizing one portion sufficiently to set free practically all the contained bromin, extracting the bromin thus set free by means of air, passing the bromin-laden air through sodium carbonate, and then using the second portion of brine to absorb the bromin not taken up by the sodium carbonate.

21. The steps in the process of manufacturing bromin from bromid-containing brines which consist, in dividing the said brine into two portions, oxidizing the first portion and extracting the bromin by contact with air; bringing the second portion into contact with air from which most of the bromin has been recovered, then into contact with air containing a larger percentage of unrecovered bromin, and finally mingling it with the aforesaid first portion of the brine.

22. The steps in the process of manufacturing bromin from bromid-containing brines which consist, in dividing said brine into two portions, oxidizing and blowing out one portion, and absorbing part of the bromin thus formed in an alkaline carbonate, and then absorbing the remainder of the bromin in the other portion of brine.

23. The steps in the continuous process of manufacturing bromin from bromid-containing brines which consist, in dividing said brine into two portions, oxidizing one portion with the production of free bromin and free chlorin, blowing out said gases and absorbing part of the bromin in an alkaline carbonate and absorbing the remainder of the bromin in the other portion of brine, then absorbing the chlorin, produced by the oxidation of the first portion, in the second portion.

24. The steps in the process of manufacturing bromin from bromid-containing brines which consist, in dividing said brine into two portions, oxidizing one portion with the production of free bromin and free chlorin, blowing out said gases and purifying them, then absorbing part of the bromin thus formed in an alkaline carbonate and absorbing the remainder of the bromin in the other portion of brine.

Signed by me this 19th day of May, 1903.

HERBERT H. DOW.

Attest:
   D. T. DAVIES,
   G. W. SAYWELL.